United States Patent
Machiraju

(10) Patent No.: US 8,325,133 B1
(45) Date of Patent: Dec. 4, 2012

(54) SECURE OPPORTUNISTIC USE OF EXTERNAL INTERFACES

(75) Inventor: Sridhar Machiraju, Burlingame, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 973 days.

(21) Appl. No.: 12/349,936

(22) Filed: Jan. 7, 2009

(51) Int. Cl.
*G09G 5/00* (2006.01)

(52) U.S. Cl. .................. 345/156; 726/1; 726/4; 726/14; 726/26; 455/410; 455/411

(58) Field of Classification Search ......................... None
See application file for complete search history.

(56) References Cited

U.S. PATENT DOCUMENTS

| | | | | |
|---|---|---|---|---|
| 7,631,181 B2* | 12/2009 | Hirata et al. | | 713/151 |
| 7,636,936 B2* | 12/2009 | Wright et al. | | 726/1 |
| 7,689,169 B2* | 3/2010 | Lee et al. | | 455/41.2 |
| 2003/0061606 A1* | 3/2003 | Hartwig et al. | | 725/25 |
| 2005/0066197 A1* | 3/2005 | Hirata et al. | | 713/201 |
| 2005/0076248 A1* | 4/2005 | Cahill et al. | | 713/202 |
| 2005/0091302 A1* | 4/2005 | Soin et al. | | 709/200 |
| 2007/0202807 A1* | 8/2007 | Kim | | 455/41.2 |
| 2007/0277230 A1* | 11/2007 | Hawkins et al. | | 726/4 |
| 2008/0151050 A1* | 6/2008 | Self | | 348/143 |

OTHER PUBLICATIONS

Garmin Ltd., "Nuvi 205 and 205W Series Owners' Manual", Jul. 2008.
Motorola, Inc., "Motomanual HS850", 2004.

* cited by examiner

*Primary Examiner* — Dismery Mercedes

(57) ABSTRACT

Embodiments of the invention are directed to using external interfaces. One or more external interfaces that are available for use are discovered. One or more of the discovered external interfaces are selected as selected external interfaces. The selected interfaces are connected to a wireless device. The selected interfaces are used as primary interfaces subject to a security policy.

20 Claims, 6 Drawing Sheets

SECURE OPPORTUNISTIC USE OF EXTERNAL INTERFACES

INTRODUCTION

Many different types of devices are network-enabled (e.g., displays, mice, and keyboards), often having one or more wireless network interfaces. This allows such devices to export information about device properties (e.g., screen resolution). Additionally, network-enabled wireless devices could use discovery protocols to locate network-enabled devices within the wireless devices' communication range, potentially discovering information about the use or services provided by the devices discovered. These wireless devices may have limited resources, such as small screen sizes and limited input devices as internal resources.

SUMMARY

Embodiments of the invention are defined by the claims below, not this summary. A high-level overview of various embodiments of the invention is provided to introduce a selection of concepts that are further described below in the detailed description. This summary is not intended to identify key features or essential features of the claimed subject matter, nor is it intended to be used as an aid in isolation to determine the scope of the claimed subject matter.

Embodiments of the invention are related to using external interfaces. A number of external interfaces that are available for use are discovered by a wireless device. One or more of the discovered interfaces are selected as selected interfaces. The selected interfaces are connected to a wireless device. The selected interfaces are used as primary interfaces subject to a security policy.

BRIEF DESCRIPTION OF THE DRAWINGS

Illustrative embodiments of the invention are described in detail below with reference to the attached drawing figures, which are incorporated by reference herein and wherein.

DETAILED DESCRIPTION

Figure 1:
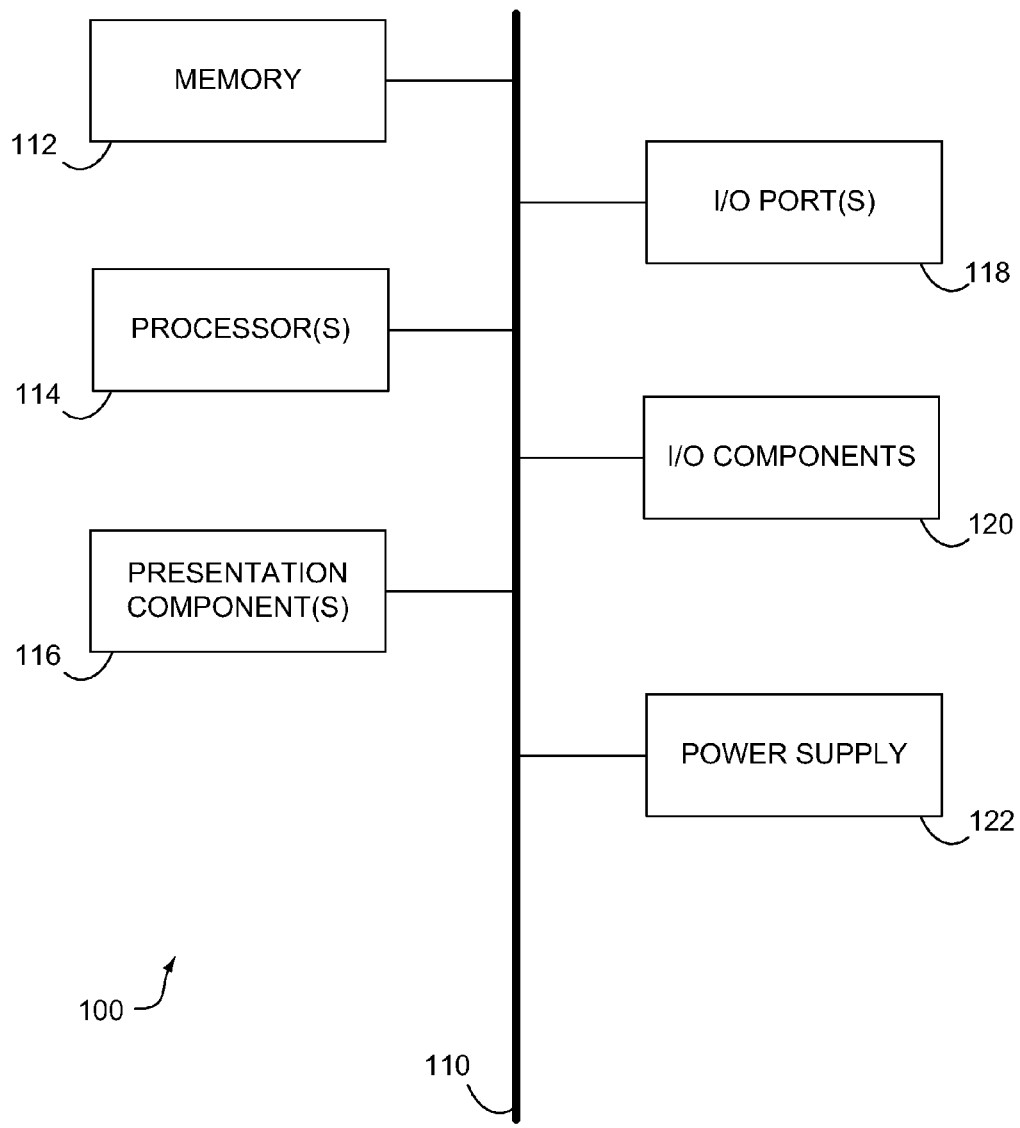
FIG. 1 depicts a block diagram of an exemplary computing environment suitable for implementing an embodiment of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the invention are directed to using external interfaces from a wireless device. Network-enabled devices in an environment, which may be accessible to a wireless computing device, may serve as external input and output devices. Wireless devices may have limited screen size, screen resolution, and color depth associated with the internal display device. Additionally, wireless devices may have limited input device options (e.g., small or no keyboard and no mouse). Input and output devices that are network-enabled could be used as additional external input and output resources by a wireless device. In such a scenario, the wireless device would act as a server, processing data and requests, receiving input from some number of network-connected input devices and sending output to some number of network-connected display devices.

Those skilled in the art will recognize that there are a number of different network-connected devices that could be used as external input and output devices. By way of example, input devices might include keyboards, mice, joysticks, gesture-recognition apparatus, touch-screens, multi-touch devices, microphones, and touch-pads. Display devices might include monitors, plasma screens, liquid crystal displays (LCDs), touch-screens, speakers, and headsets.

Wireless devices and network-enabled, external, input and output devices may use a number of technologies and mechanisms for allowing connections to be made. According to an embodiment of the invention, wired links, such as those used in Ethernet and token ring technologies could be used to connect devices. According to another embodiment, wireless technologies, such as IEEE 802.11 compatible technologies (WiFi), Worldwide Interoperability for Microwave Access technologies (WiMAX), and Bluetooth could be used to connect devices. Those skilled in the art will recognize that many different, network-enabling technologies could be used to provide access to external devices for wireless devices.

In addition to network enablement, a discovery protocol may be used by a wireless device to locate external devices that can serve as external interfaces. Many devices that are network enabled may expose services that make them available to serve as external interfaces to wireless devices. In accordance with an embodiment of the invention, a discovery protocol could be used to locate potential external interfaces. Additionally, during the discovery process, information providing characteristics of the external interface could be received. These characteristics could be used by users or by the wireless device to choose appropriate external interfaces to use for various applications. Those skilled in the art will recognize that there are a number of discovery protocols and mechanisms suitable for discovering external interfaces in the environment and for learning characteristics of discovered external interfaces. By way of example, the Bluetooth discovery protocol could be used. As another example, Universal Plug-and-Play could be used.

According to an embodiment of the invention, a security policy could be used to determine what information should be passed via external interfaces. External interfaces that may be used as primary display or input devices may not be trusted by the user of the wireless device. For example, external interface may be located on seats on airplanes, on walls in public buildings, and in other owners' cars. There is no guarantee that data sent between the wireless device and the external interfaces discovered will be kept private. It is possible that another application running on the external interface, or on a device on the network, could capture and store critical information passed between the wireless device and any connected external interface. A security policy could be used to prevent such critical information from being passed to any external device.

By way of example, a security policy could prevent critical data, such as usernames and passwords, from being input using an external input device. Additionally, such critical data could be prevented from being displayed on an external interface. According to an embodiment of the invention, upon receiving an application request for critical data to be entered by the computing device, the external interface could be disabled temporarily and a message could be displayed informing the user of the need to use the internal input device for entering the critical information. According to another embodiment, upon receiving an application request to display critical data, the external interface could have a blank screen displayed and the internal interface could be activated to display the critical data.

In accordance with an embodiment of the invention, the security policy could contain lists of types of data that are not allowed to be transferred between external devices and the wireless device. By way of example, the security policy could contain a list of input data types that are not allowed to be received from external interfaces and a list of display data types that are not allowed to be sent to external interfaces. Those skilled in the art will recognize that there are a number of ways in which data types could be defined. By way of example, data types could be defined in terms of purpose, such as password, or request type, such as secure Hyper Text Transfer Protocol.

According to a further embodiment of the invention, an application (e.g., browser, map) could know of the data types whereas the external interface decisions are likely done by an operating system. Each application could make its own security policy and signal to the operating system the use of external interfaces. For example, whether the current active window could be displayed on external displays or not. Alternatively, it could signal a single security level and the operating system could decide which external devices could be used.

An embodiment of the invention is directed to computer-readable media storing computer-executable instructions for using external interfaces. One or more external interfaces that are available for use are discovered. One or more of the external interfaces are selected as selected external interfaces. The selected interfaces are connected to a wireless device. The selected interfaces are activated as primary interfaces for input and output, subject to a security policy. Activating an external interface as a primary interface causes the computing device to use the external interface for standard input and/or output.

According to an embodiment, a request for data to be input via an interface is received. A data type associated with the requested data is checked against a security policy. The connected interface is used to acquire the requested data, if the data type is allowed by the security policy. An internal interface is used to acquire the data, if the data type is not allowed by the security policy.

According to a further embodiment, a request to display data via an interface is received. A data type associated with the data to be displayed is checked against a security policy. The connected interface is used to display the data, if the data type is allowed by the security policy. An internal interface is used to display the data, if the data type is not allowed by the security policy.

Having briefly described an overview of embodiments of the invention, an exemplary operating environment in which embodiments of the invention may be implemented is described below. Referring initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Some embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, many processors have memory. We recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, Random-Access Memory (RAM), Read-Only Memory (ROM), Electrically-Erasable, Programmable, Read-Only Memory (EEPROM), flash memory or other memory technology, Compact Disk, Read-Only Memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computing device 100.

Memory 112 includes computer-storage media in the form of volatile memory. Exemplary hardware devices include solid-state memory, such as RAM. Memory 116 includes computer-storage media in the form of non-volatile memory. The memory 116 may be removable, nonremovable, or a combination thereof. Exemplary hardware devices include solid-state memory, hard drives, optical-disc drives, etc. Computing device 100 includes one or more processors 114 that read data from various entities such as memory 112 or I/O components 120. I/O components 120 present data indications to a user or other device. Exemplary output components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
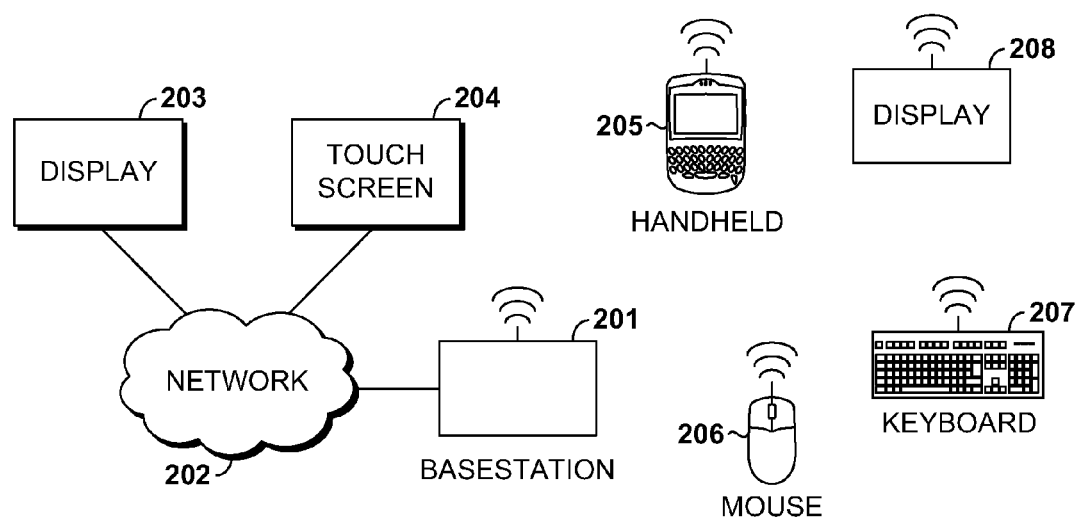
FIG. 2 depicts a block diagram of an exemplary network environment suitable for implementing an embodiment of the invention.

Referring to FIG. 2, a block diagram presenting a network suitable for implementing an embodiment of the invention is depicted. A wireless device 205 is network-enabled and capable of connecting to a plurality of other devices. By way of example, the wireless device could be a handheld personal digital assistant (PDA), a laptop, and a wireless phone. The wireless device 205 may have a number of network technologies available for connecting to other devices. By way of example, the wireless device may have a wired Ethernet connection, a WiFi connection, a Bluetooth connection, and a third generation (3G) connection. A basestation 201 may be present in the environment. The basestation 201 could provide the wireless device 205 with a point of connection to a number of network resources available on a network 202. By way of example, the network 202 could be the Internet, containing a plurality of connected devices.

A number of different types of devices may be accessible via the basestation 201. For example, a display device 203 may be accessible. Many of these devices may provide external interfaces that could be used as input interfaces or output interfaces. Additionally, some external interfaces could function as both input and output devices (e.g., a touch screen). Output devices are capable of displaying data. There are many ways in which data could be displayed. Broadly used, data can be displayed for a user by visually, aurally, tactilely, and olfactorily depicting a representation of the data. For example, network-enabled monitors, network-enabled televisions, and network-enabled speakers could act as external display devices. An input device 204 may also be accessible via the network 202. There are many types of input devices that might be suitable for use as external input interfaces. By way of example, network-enabled touch-screens, network-enabled keyboards, and other computing devices containing input devices could be used as external input interfaces.

In addition to external interfaces available via a basestation 201, there may be a number of network-enabled devices in the environment available for direct connection. For example, a display device 208, a keyboard 207, and a mouse 206 may be available in the network. Those skilled in the art will recognize that there are many possible network-enabling technologies that would be able to provide direct connections between a wireless device 205 and one of the available external interfaces 208, 207, 206. By way of example, Bluetooth could be used to connect the wireless device 205 to an external interface 208. 207, 206.

Figure 3:
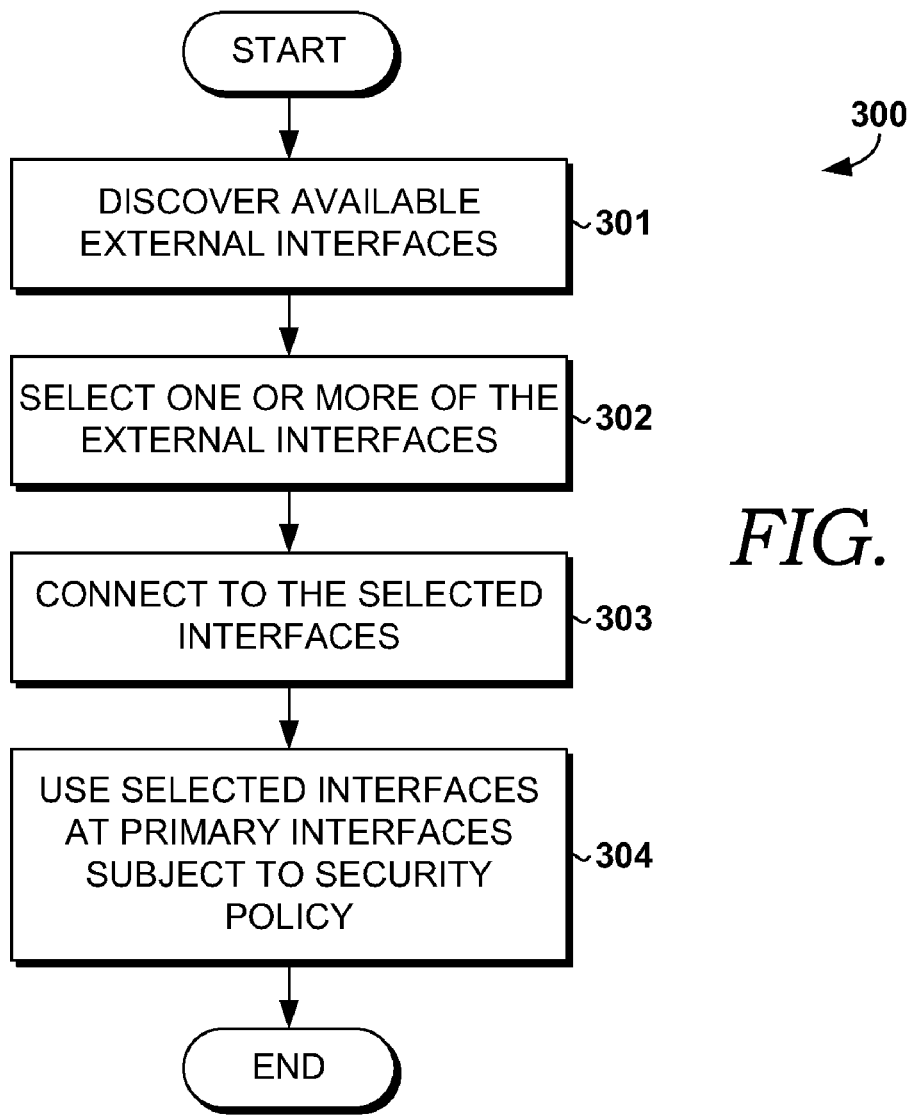
FIG. 3 is a flow diagram showing a method of using an external interface, in accordance with an embodiment of the invention.

Turning now to FIG. 3, a flow diagram depicting a method 300 of using an external interface is given. A number of available external interfaces are discovered, as shown at block 301. By way of example, a Bluetooth discovery protocol could be used to discover devices in the environment. According to an embodiment, the discovery protocol could additionally discover information about the external interfaces discovered. Such information could include a number of different characteristics. By way of example, the information could include screen size, screen resolution, color depth, and input device type. Those skilled in the art will recognize that there are many other forms of information that may be included when an external interface is discovered.

One or more of the external interfaces is selected, becoming selected external interfaces, as shown at block 302. According to an embodiment of the invention, users may select interfaces from a list of external interfaces. According to another embodiment, external interfaces may be selected automatically according to an algorithm. The algorithm could match external interface characterizations returned during device discovery against applications requirements.

The wireless device is connected to the selected interfaces, as shown at block 303. According to an embodiment, the connection is made using a wireless link. There are many technologies that are suitable for making a wireless connection, including WiFi, WiMAX, 3G, and Bluetooth. According to another embodiment, the wireless device is connected to the selected interfaces using a wired connection. By way of example, an Ethernet connection could be used to connect the wireless device to the selected interfaces. According to a further embodiment of the invention, the connection between the wireless device and the selected interfaces could be encrypted. For example, a public-key encryption algorithm could be used to encrypt the connection.

The selected interfaces are used as primary interfaces subject to a security policy, as shown at block 304. Data to be displayed and data to be input could be displayed and input using the connected external interfaces. A security policy could ensure that only data allowed to be accessed by external devices be displayed or received via a connected external interface. By way of example, a security policy could be implemented as a list of data types that are not allowed to be displayed on external interfaces and a list of data types that are not allowed to be received from external interfaces. Alternatively, a security policy could be implemented as a list of data types that are allowed to be display or received from external interfaces. As a further example, the security policy could be implemented as a database, or as a simple set of files.

Figure 4:
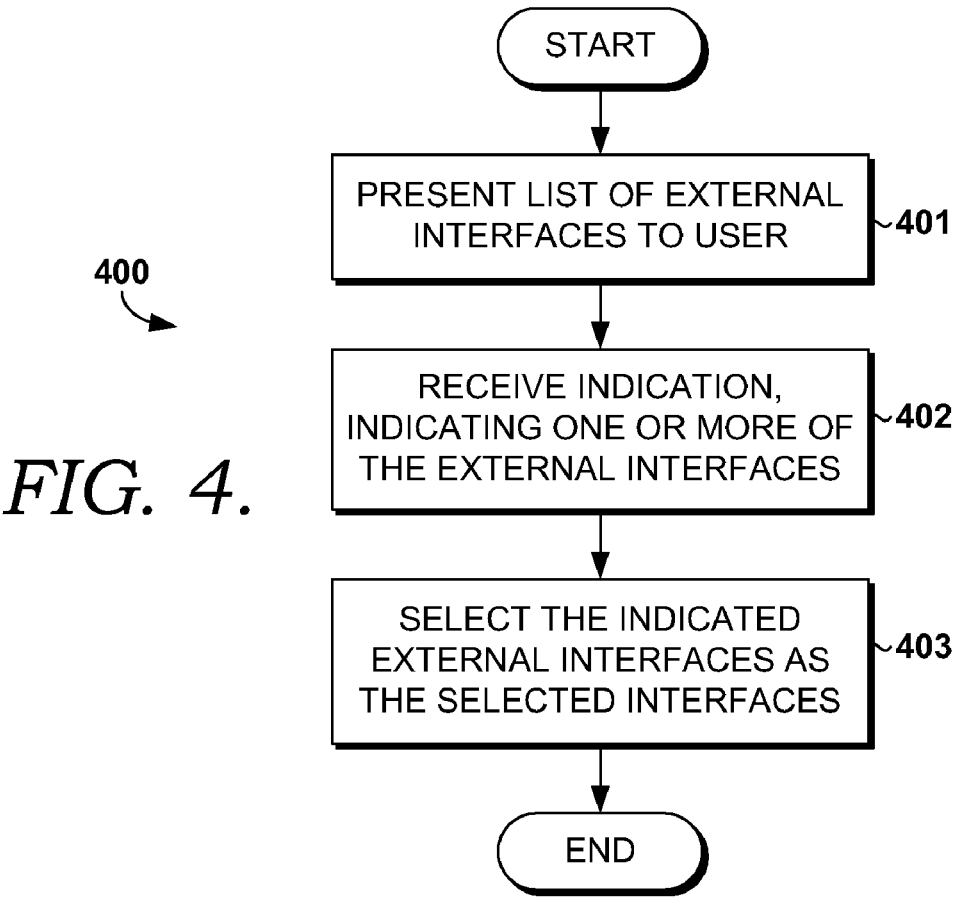
FIG. 4 is a flow diagram showing an method of selecting one or more external interfaces, in accordance with an embodiment of the invention.

Turning now to FIG. 4, a flow diagram depicting a method 400 of selecting external interfaces to be selected interfaces is presented. A list of external interfaces is presented, as shown at block 401. According to an embodiment, the list includes each external interface discovered along with a summary of the characteristics associated with each external interface. Additionally, there are numerous ways the list could be presented to users. By way of example, the list could be presented on an internal display, contained on the wireless device.

An indication is received, indicating one or more of the external interfaces, as shown at block 402. According to an embodiment, the indication is generated as a response to a user interacting with the list of discovered external interfaces presented at block 401. The indication could be formatted in a number of ways, including as a list containing identifiers, identifying a number of external interfaces. The indicated external interfaces are selected as the selected external interfaces, as shown at block 403.

Figure 5:
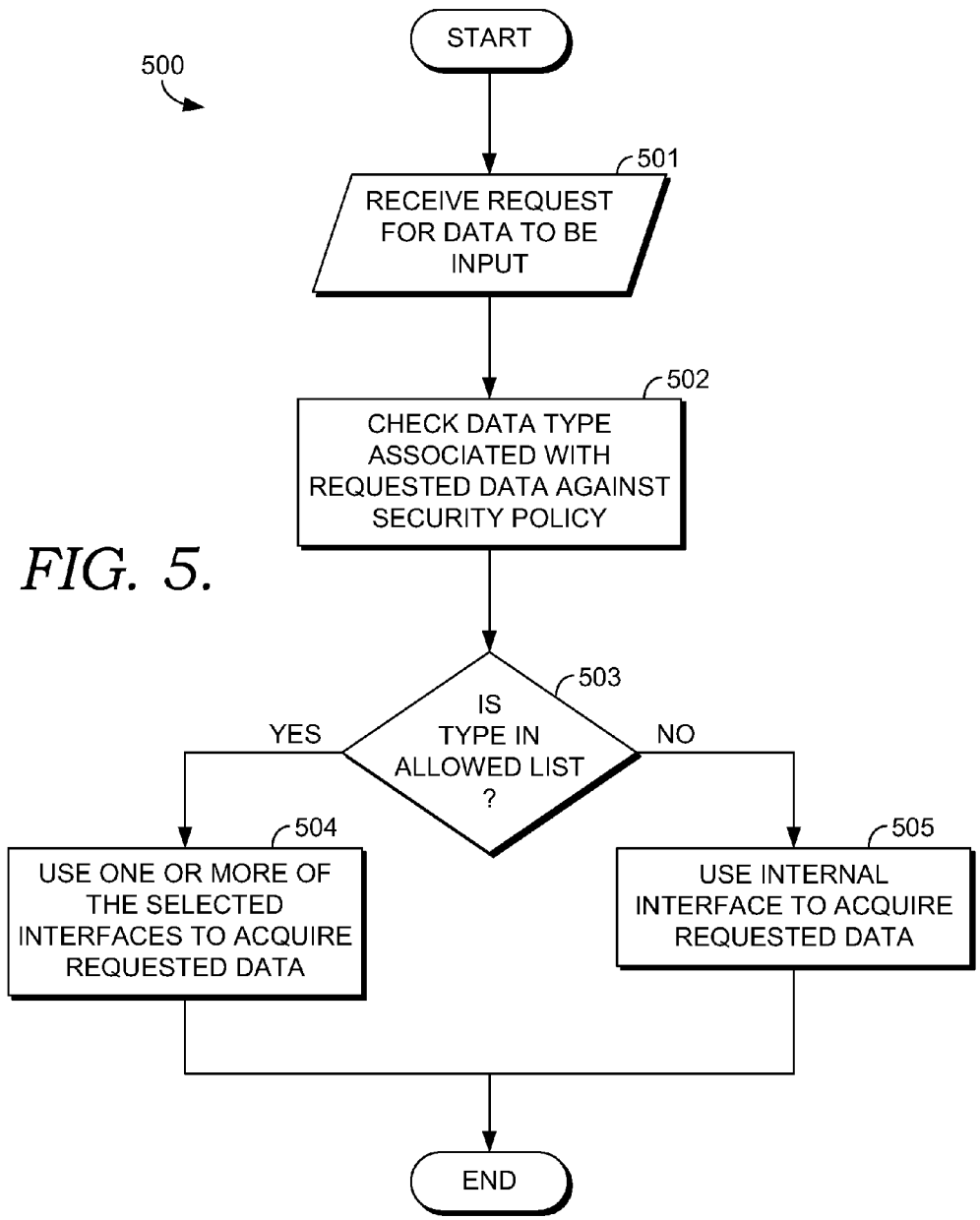
FIG. 5 is a flow diagram showing a method of using an external interface to acquire data, in accordance with an embodiment of the invention.

Turning now to FIG. 5, a flow diagram showing a method 500 of using an external interface is given. A request for data to be input is received, as shown at block 501. According to an embodiment of the invention, the request could indicate a type of data. By way of example, the type of data could be a password, or some data over a secure connection.

The data type requested is checked against a security policy, as shown at block 502. According to an embodiment of the invention, the security policy may be a list of data types allowed to be received from an external input interface. A determination is made on whether the data type is allowable over an external interface according to the security policy, as shown at block 503.

If the data type is allowable over an external interface, then one or more of the selected external interfaces are used to receive the requested input data, as shown at block 504. According to an embodiment of the invention, the data could be received over a wireless link. According to another embodiment of the invention, the data could be received over a wired link. According to a further embodiment of the invention, the data could be received over an encrypted link.

If the data type is not allowable over an external interface, then an internal input interface is used to receive the requested data, as shown at block 505. According to an embodiment of the invention, a message could be displayed on a currently used display interface informing the user that the input must be received through an internal interface.

Figure 6:
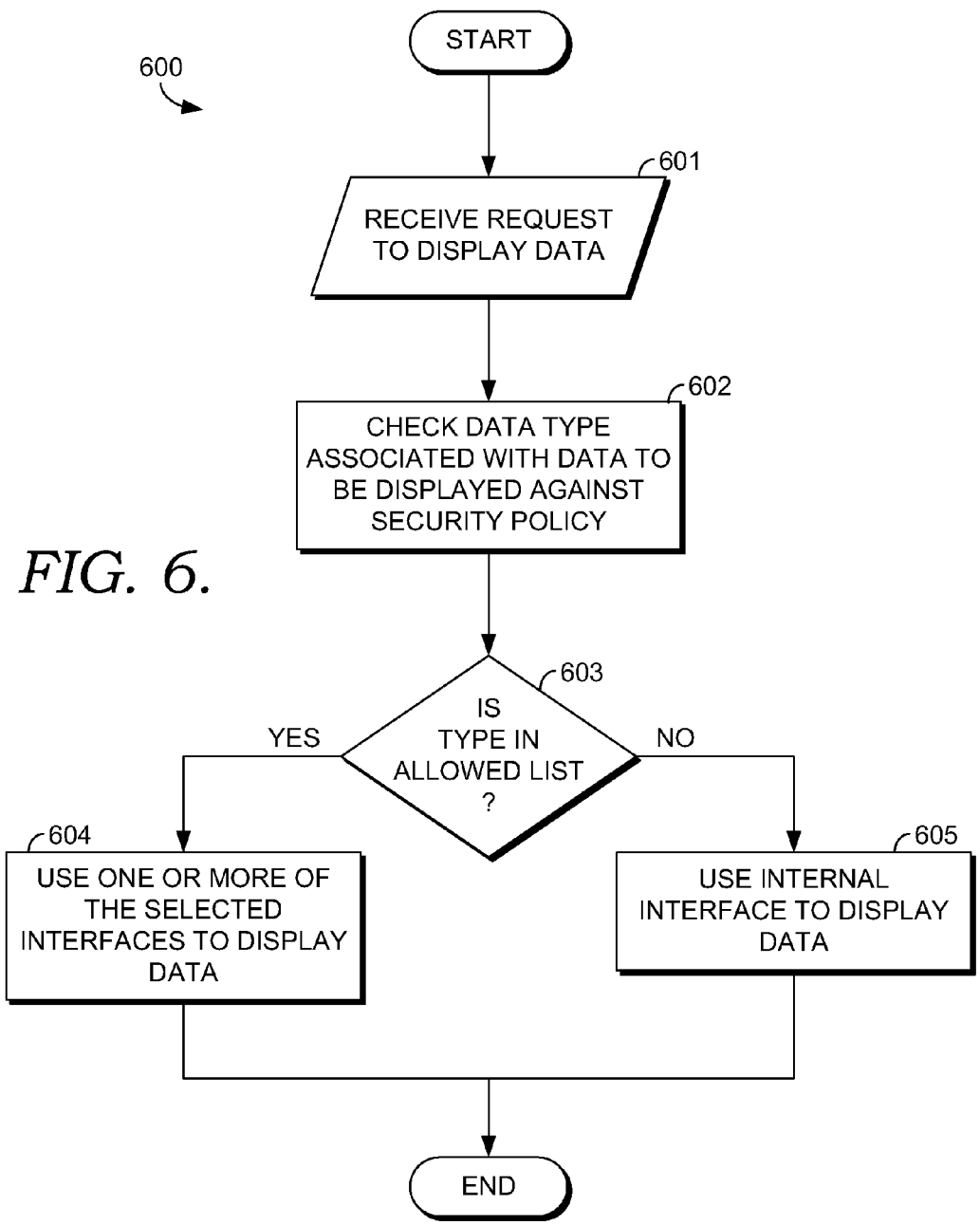
FIG. 6 is a flow diagram showing a method of using an external interface to display data, in accordance with an embodiment of the invention.

Turning now to FIG. 6, a flow diagram depicting a method 600 of using an external interface to display data is given. A request to display data is received, as shown at block 601. The data type associated with the data that is requested to be displayed is checked against a security policy, as shown at block 602. According to an embodiment of the invention, the security policy may be a list of data types allowed to be sent to an external display interface. A determination is made on whether the data type is allowable over an external interface according to the security policy, as shown at block 603.

If the data type is allowable over an external interface, then one or more of the selected external interfaces are used to display the data requested to be displayed, as shown at block 604. According to an embodiment of the invention, the data could be sent to the external interface over a wireless link. According to another embodiment of the invention, the data could be sent to the external interface over a wired link. According to a further embodiment of the invention, the data could be sent to the external interface over an encrypted link.

If the data type is not allowable over an external interface, then an internal display interface is used to display the data, as shown at block 605. According to an embodiment of the invention, a currently used external display interface could display a blank screen while the data is displayed on an internal interface. According to another embodiment, a message could be displayed on a currently used external display interface informing the user that the data to be displayed will be displayed on an internal interface.

Many different arrangements of the various components depicted, as well as components not shown, are possible without departing from the spirit and scope of embodiments of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of embodiments of the invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more nontransitory computer-readable media storing computer-executable instructions for performing a method of using external interfaces, the method comprising:
    at a mobile device, discovering a plurality of external interfaces available for use as an external input and/or output interface for the mobile device in addition to an input and/or output interface on the mobile device;
    selecting an external interface from the plurality of external interfaces as a selected interface;
    connecting to the selected interface; and
    activating the selected interface as a primary interface for use as an external input and/or output interface subject to a security policy that prevents a type of data from being transferred between the external interface and the mobile device, wherein when the security policy prevents the type of data from being transferred between the external interface and the mobile device, an input and/or output interface on the mobile device is activated for use to acquire or display the type of data that is prevented from being transferred between the external interface and the mobile device.

2. The media of claim 1, wherein discovering a plurality of external interfaces comprises using a discovery protocol.

3. The media of claim 2, wherein the discovery protocol receives information about the external interface.

4. The media of claim 3, wherein the information received about the external interface comprises one or more of the following: screen resolution, screen size, color depth, or input device type.

5. The media of claim 1, wherein selecting the external interface comprises:
    presenting a list of the plurality of external interfaces to a user;
    receiving an indication from the user, indicating one or more of the plurality of external interfaces; and
    selecting the external interface indicated by the indication as the selected interface.

6. The media of claim 1, wherein connecting to the selected interface comprises connecting to the selected interface selecting using a wireless link.

7. The media of claim 1, wherein connecting to the selected interface comprises connecting to the selected interface using a wired link.

8. The media of claim 1, wherein the security policy comprises a list of types of data that may be displayed on an external interface and a list of types of data that may be input via an external interface.

9. The media of claim 8, wherein using the selected interface as the primary interface for use as the external input and/or output interface subject to the security policy comprises:
    receiving a request for data to be input via an interface;
    checking a data type associated with the request for data against the list of types of data that may be input via an external interface;
    acquiring the requested data with the selected interface as the primary interface when the data type is in the list of types of data that may be input via an external interface; and
    acquiring the requested data with an internal interface when the data type is not in the list of types of data that may be input via an external interface.

10. The media of claim 8, wherein using the selected interface as the primary interface for use as the external input and/or output interface subject to the security policy comprises:
- receiving a request to display data via an interface;
- checking a data type associated with the data to be displayed against the list of types of data that may be displayed on an external interface;
- displaying the data with the selected interface as the primary interface when the data type is in the list of types of data that may be displayed on an external interface; and
- displaying the data with an internal interface when the data type is not in the list of types of data that may be displayed on an external interface.

11. The media of claim 10, wherein displaying the data with an internal interface when the data type is not in the list of types of data that may be displayed on an external interface further comprises displaying a blank screen on one or more of the selected interface.

12. One or more nontransitory computer-readable media storing computer-executable instructions for performing a method of using external interfaces, the method comprising:
- at a mobile device, discovering one or more external interfaces available for use as external input interfaces for the mobile device in addition to an internal interface on the mobile device;
- connecting to one of the one or more external interfaces as a connected interface for use as an external input interface;
- receiving a request for data to be input via the connected interface;
- checking a data type associated with the requested data against a security policy;
- acquiring the requested data with the connected interface when the data type is allowed by the security policy to be received via the connected interface; and
- acquiring the requested data with the internal interface on the mobile device when the data type is not allowed by the security policy to be received via the connected interface.

13. The media of claim 12, wherein the discovering one or more external interfaces comprises using a discovery protocol that provides information characterizing each of the one or more external interfaces.

14. The media of claim 13, wherein the information characterizing the one or more external interfaces comprises an input device type.

15. The media of claim 12, wherein acquiring the requested data with the connected interface comprises receiving the requested data over an encrypted link.

16. One or more nontransitory computer-readable media storing computer-executable instructions for performing a method of using external interfaces, the method comprising:
- at a mobile device, discovering one or more external interfaces available for use as an external output interface for the mobile device in addition to an internal output interface on the mobile device;
- connecting to one of the one or more external interfaces as a connected interface;
- receiving a request to display data via the connected interface;
- checking a data type associated with the data to be displayed against a security policy;
- sending the data to the connected interface when the data type is allowed by the security policy to be displayed via the connected interface; and
- displaying the data with the internal interface on the mobile device when the data type is not allowed by the security policy to be displayed via the connected interface.

17. The media of claim 16, wherein the discovering one or more external interfaces comprises using a discovery protocol that provides information characterizing each of the one or more external interfaces.

18. The media of claim 17, wherein the information characterizing the one or more external interfaces comprises one or more of the following: screen size, screen resolution, color depth, or decibel range.

19. The media of claim 16, wherein sending the data to the connected interface comprises sending the data to the connected interface over an encrypted link.

20. The media of claim 16, wherein the data to be displayed is audio data to be displayed by playing through one or more audio output devices.

* * * * *